US012704021B2

(12) United States Patent
Bohlen

(10) Patent No.: US 12,704,021 B2
(45) Date of Patent: Aug. 11, 2026

(54) MOTOR ASSEMBLY FOR AN ARCHITECTURAL OPENING COVERING SYSTEM

(71) Applicant: Hunter Douglas Industries B.V., Rotterdam (NL)

(72) Inventor: Jörg Bohlen, Langen (DE)

(73) Assignee: Hunter Douglas Industries B.V., Rotterdam (NL)

( * ) Notice: Subject to any disclaimer, the term of this patent is extended or adjusted under 35 U.S.C. 154(b) by 200 days.

(21) Appl. No.: 18/694,254

(22) PCT Filed: Aug. 26, 2022

(86) PCT No.: PCT/EP2022/073768
§ 371 (c)(1),
(2) Date: Mar. 21, 2024

(87) PCT Pub. No.: WO2023/046411
PCT Pub. Date: Mar. 30, 2023

(65) Prior Publication Data

US 2024/0384591 A1 Nov. 21, 2024

(30) Foreign Application Priority Data

Sep. 22, 2021 (GB) ..................................... 2113477

(51) Int. Cl.
*E06B 9/322* (2006.01)
*E06B 9/323* (2006.01)
*E06B 9/262* (2006.01)

(52) U.S. Cl.
CPC .............. *E06B 9/322* (2013.01); *E06B 9/323* (2013.01); *E06B 2009/2625* (2013.01)

(58) Field of Classification Search
CPC ..... E06B 2009/2441; E06B 2009/2625; E06B 2009/3222; E06B 2009/2627; E06B 9/322
See application file for complete search history.

(56) References Cited

U.S. PATENT DOCUMENTS 8,540,005 B2 * 9/2013 Baugh ..................... E06B 9/322 160/310
8,830,058 B2 * 9/2014 Yeh ...................... A47H 5/0325 160/310

(Continued)

FOREIGN PATENT DOCUMENTS

CN 1659357 A 8/2005
CN 101275456 A 10/2008

(Continued)

OTHER PUBLICATIONS

International Search Report and Written Opinion issued in PCT/EP2022/073768, Dated Nov. 30, 2022 (11 pages).

*Primary Examiner* — Johnnie A. Shablack
(74) *Attorney, Agent, or Firm* — Dority & Manning, P.A.

(57) ABSTRACT

A motor assembly for an architectural opening covering system includes a master motor, a slave motor, power storage for powering the master motor and the slave motor, and control circuitry configured to control operation of the master and slave motors. The motor assembly includes a housing which houses the master and slave motors, the power storage and the control circuitry. The housing includes a first end and a second end, with the master and slave motors being arranged at the first end of the housing side-by-side. The power storage is arranged in the housing at a position spaced from the master and slave motors towards the second end of the housing. The housing is configured to be supported in one end of a rail in a first orientation and in the other end of a rail in a second orientation, opposite to the first orientation.

17 Claims, 20 Drawing Sheets

(56) References Cited

U.S. PATENT DOCUMENTS

| | | | | |
|---|---|---|---|---|
| 8,887,786 | B2 * | 11/2014 | Anderson | E06B 9/32 160/167 R |
| 9,045,215 | B2 * | 6/2015 | Knowles | E06B 9/302 |
| 9,335,753 | B2 | 5/2016 | Baugh | |
| 9,470,040 | B2 * | 10/2016 | Hall | E06B 9/303 |
| 9,732,555 | B2 * | 8/2017 | Morris | E06B 9/262 |
| 9,765,565 | B2 * | 9/2017 | Morris | E06B 9/262 |
| 9,797,188 | B2 * | 10/2017 | Rettig | E06B 9/266 |
| 10,655,387 | B2 * | 5/2020 | Perache | E06B 9/68 |
| 10,895,105 | B1 * | 1/2021 | Marchese | E06B 9/322 |
| 11,448,009 | B2 * | 9/2022 | Otsuka | E06B 9/262 |
| 11,486,193 | B2 * | 11/2022 | Chiang Huang | E06B 9/322 |
| 11,713,619 | B2 * | 8/2023 | Negrello | E06B 9/322 160/168.1 P |
| 12,006,765 | B2 * | 6/2024 | Nien | H02K 11/21 |
| 12,078,011 | B2 * | 9/2024 | Zhang | H02P 5/74 |
| 12,123,257 | B2 * | 10/2024 | Dupielet | E06B 9/322 |
| 12,237,800 | B2 * | 2/2025 | Nien | H02P 6/30 |
| 12,286,836 | B2 * | 4/2025 | Lagarde | E06B 9/322 |
| 12,460,476 | B2 * | 11/2025 | Zhang | E06B 9/322 |
| 2008/0099281 | A1 | 5/2008 | Anderson et al. | |
| 2008/0223532 | A1 | 9/2008 | Auger | |
| 2012/0125543 | A1 | 5/2012 | Chambers et al. | |
| 2012/0200247 | A1 * | 8/2012 | Baugh | E06B 9/322 318/468 |
| 2014/0000816 | A1 * | 1/2014 | Yeh | E06B 9/262 160/10 |
| 2015/0013920 | A1 * | 1/2015 | Mullet | E06B 9/303 160/84.02 |
| 2018/0163462 | A1 | 6/2018 | Duan | |
| 2020/0300036 | A1 | 9/2020 | Tan et al. | |
| 2021/0189798 | A1 * | 6/2021 | Nien | E06B 9/38 |
| 2024/0093551 | A1 * | 3/2024 | Jiang | E06B 9/262 |
| 2024/0138607 | A1 * | 5/2024 | Jiang | E06B 9/322 |
| 2025/0003288 | A1 * | 1/2025 | Yang | E06B 9/262 |
| 2025/0027362 | A1 * | 1/2025 | Dzierzak | E06B 9/323 |

FOREIGN PATENT DOCUMENTS

| | | | | |
|---|---|---|---|---|
| CN | 109898979 A | | 6/2019 | |
| EP | 3489452 | | 5/2019 | |
| WO | WO-2012109147 A1 | * | 8/2012 | G05B 19/042 |

* cited by examiner

MOTOR ASSEMBLY FOR AN ARCHITECTURAL OPENING COVERING SYSTEM

The present application is a US national phase of International Patent Application No. PCT/EP2022/073768, filed Aug. 26, 2022, which, in turn, is based upon and claims the right of priority to GB Patent Application No. 2113477.0, filed Sep. 22, 2021, the disclosures of both of which are hereby incorporated by reference herein in their entirety for all purposes.

The present invention relates to a motor assembly for an architectural opening covering system and also one or more such architectural opening covering systems combined with or including at least one such motor assembly.

Architectural opening covering assemblies of different types are known including, for example, blinds, shades, shutters etc. In some such covering assemblies, a flexible material such as a fabric is used as the covering. A drive mechanism enables a user to extend and retract the fabric relative to an opening such as a window, door, or other opening in an architectural structure.

WO 2012/109147 describes an architectural opening covering system using a top down/bottom up configuration having extending and retracting coverings such as blinds, shades etc. In the top down/bottom up configuration, a top rail is fixedly mounted to an upper portion of an architectural opening and is operably coupled to movable middle and bottom rails. A covering such as a blind, shade, web, fabric etc., is connected between the movable middle and bottom rails so that, as the middle and bottom rails move toward and away from one another, the covering extends to cover an architectural opening and retracts to expose the architectural opening. The movability of the middle and bottom rails enables selective covering of upper, middle, or bottom portions of an architectural opening using the covering.

One or more motor assemblies may be provided to move the middle and bottom rails. One or more controllers may be provided that detect positions of the movable middle and bottom rails and enable movements thereof based on the detected positions.

Architectural opening covering systems are generally configured with a front side and a rear side, where the front side is intended to face inwardly of the architectural structure. It is usually desirable for any user interface, including connection points, display features and/or buttons to be on the front side facing inwardly of the architectural structure.

It is herein recognised that users may also require interface features to be provided on either of the ends of the rail of the architectural opening covering system. For example, for a top down, bottom up arrangement with the user interface in the top horizontal rail, the user may require the interface to be either at the left end of the top rail or the right end of the top rail (when viewing the front side) depending on the architectural structure to which the architectural opening covering system is to be installed.

According to the present invention, there is provided a motor assembly for an architectural opening covering system. The motor assembly includes a master motor providing rotational drive about a master drive axis, a slave motor providing rotational drive about a slave drive axis, power storage for storing electrical energy for powering the master motor and the slave motor, and control circuitry configured to control operation of the master motor and the slave motor using the electrical energy stored in the power storage. The motor assembly includes a housing which houses the master motor, the slave motor, the power storage and the control circuitry. The housing extends in a longitudinal direction between a first end and a second end. When installed in an architectural opening covering system, this may be a horizontal direction between a left end and a right end. The master motor and the slave motor are arranged at the first end of the housing side-by-side in a lateral direction perpendicular to the longitudinal direction, the master drive axis and the slave drive axis being parallel to the longitudinal direction. In the installed state, the master motor and the slave motor may thus be arranged one in front of the other in the front-rear direction. The power storage is arranged in the housing at a position spaced from the master motor and the slave motor in the longitudinal direction towards the second end of the housing. The present invention provides for the motor assembly to be installable in an architectural opening covering system in two opposite orientations so that, in a horizontally mounted rail, the motor assembly may be installed either at the left end or the right end of that rail. In this regard, according to the present invention, the housing has an external shape and size configured to be supported in the one end of a rail of an architectural opening covering system in a first orientation with the first end of the housing facing inwardly of the rail and towards the lift mechanism and to be supported in the other end of a rail of an the architectural opening covering system in a second orientation, opposite to the first orientation, with the first end of the housing facing inwardly of the rail and towards the lift mechanism.

Thus, in a horizontal rail of the architectural opening covering system, the first end of the housing may be installed at the left end of the rail with the second end positioned inwardly of that left end or, alternatively, the first end may be installed at the right end of the rail with the second end inwardly of the right end.

In this way, the present invention allows the provision of architectural opening covering systems for installation in opposite orientations without the need for dedicated respective systems. The same motor assembly of the present invention may be provided in either of the systems, but installed in one of the two opposite orientations. The number of parts required for manufacturing is thereby reduced and the cost is reduced. The architectural opening covering system may include a rail which itself is configured to accept the housing of the motor assembly in either orientation. Alternatively, a rail may be provided to accept the housing in one orientation and another rail may be provided to accept the housing in the opposite orientation.

The control circuitry may include a printed circuit board. The printed circuit board can usefully be fitted/installed within the housing in the space left by the motors and power storage. The control circuitry may include a printed circuit board including a motor driver and a printed circuit board including user interface and control.

The power storage may include a battery. Indeed, in one arrangement, the power storage may be two batteries arranged at the second end of the housing side-by-side in the lateral direction perpendicular to the longitudinal direction.

The housing may also extend in the lateral direction between a front surface and a rear surface.

The master motor may be arranged adjacent to the front surface and the slave motor may be arranged adjacent the rear surface.

When installed in the rail of an architectural opening covering system, this places the master motor in a position often used for the master motor of such architectural opening covering systems.

The housing may extend in another direction, also perpendicular to the longitudinal direction between a top surface and a bottom surface. Preferably, in both of the first and second orientations, the front surface faces in the same direction, but, in the first and second orientations respectively, the top surface faces respectively in opposite directions.

Thus, whether or not the housing is installed in the rail of the architectural opening covering system in the first orientation or the second orientation, the master motor will always be towards the front surface. As a result, other parts of the opening covering system for controlling the cords and rails of the architectural opening covering system can be standardised irrespective of the installed orientation of the housing motor assembly. With the master motor adjacent the front surface and the slave motor adjacent the rear surface and the master motor always being towards the front of the rail of the architectural opening covering system and the slave motor always being towards the rear of the rail of the architectural opening covering system, the master and slave drive axes will always be at the same position for driving other components of the architectural opening covering system.

The motor assembly may further include, connected with the control circuitry and provided in the front surface of the housing, at least one of an LED, a connector port and a button.

These components are examples of an interface for the user. Because the housing can be installed in either the first or second orientation, the features of the user interface, such as the LED, connector port or button, may always face the front of the architectural opening covering system irrespective of which end of the architectural opening covering system the motor assembly is installed.

The features of the user interface, such as the LED, connector port and button, may be provided at the second end of the housing.

The user interface may be provided by a respective printed circuit board. The LED, connector part and button may be provided on the printed circuit board.

According to the present invention, there is also provided an architectural opening covering system including a rail extending between one end and another end and containing a lift mechanism for a covering, and a motor assembly as defined above. The rail may define an internal space at said one end configured to support the housing of the motor assembly in the first orientation with the master motor and slave motor providing drive to the lift mechanism.

The architectural opening covering system may be provided in combination with another architectural opening covering system having a rail extending between one end and another end and containing a lift mechanism for a covering. The rail of the another architectural opening covering system defines an additional internal space to support the housing of the motor assembly in the second orientation with the master motor and slave motor providing drive to the lift mechanism.

The architectural opening covering system may be a top up bottom down system, wherein the rail is a top rail and the architectural opening covering system includes a middle rail and a bottom rail and a covering extending between the middle rail and the bottom rail.

The invention will be more clearly understood from the following description, given by way of example only, with reference to the accompanying drawings, in which:

FIG. 1 illustrates an example of an architectural opening covering system;

FIGS. 2(*a*), (*b*), (*c*) and (*d*) illustrate embodiments of a motor assembly according to the present invention;

Figure 6A:
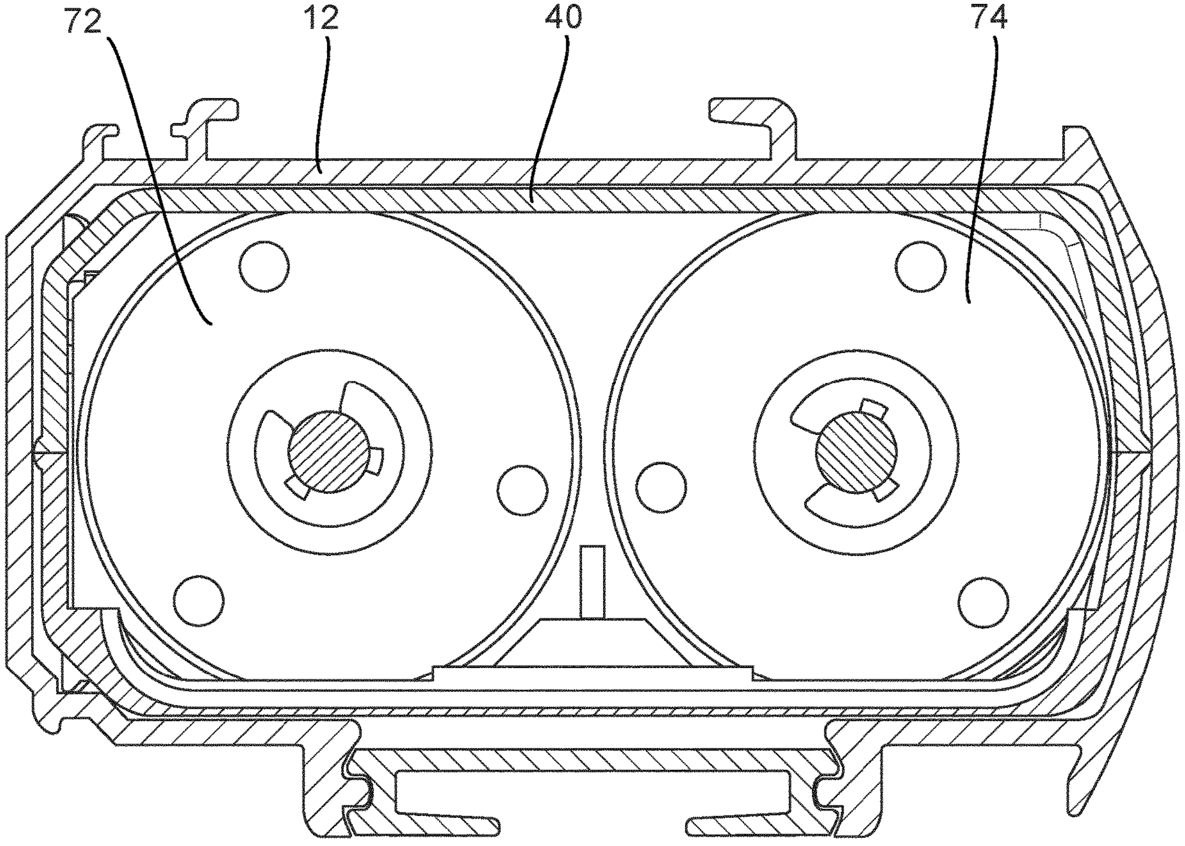
Figure 6B:
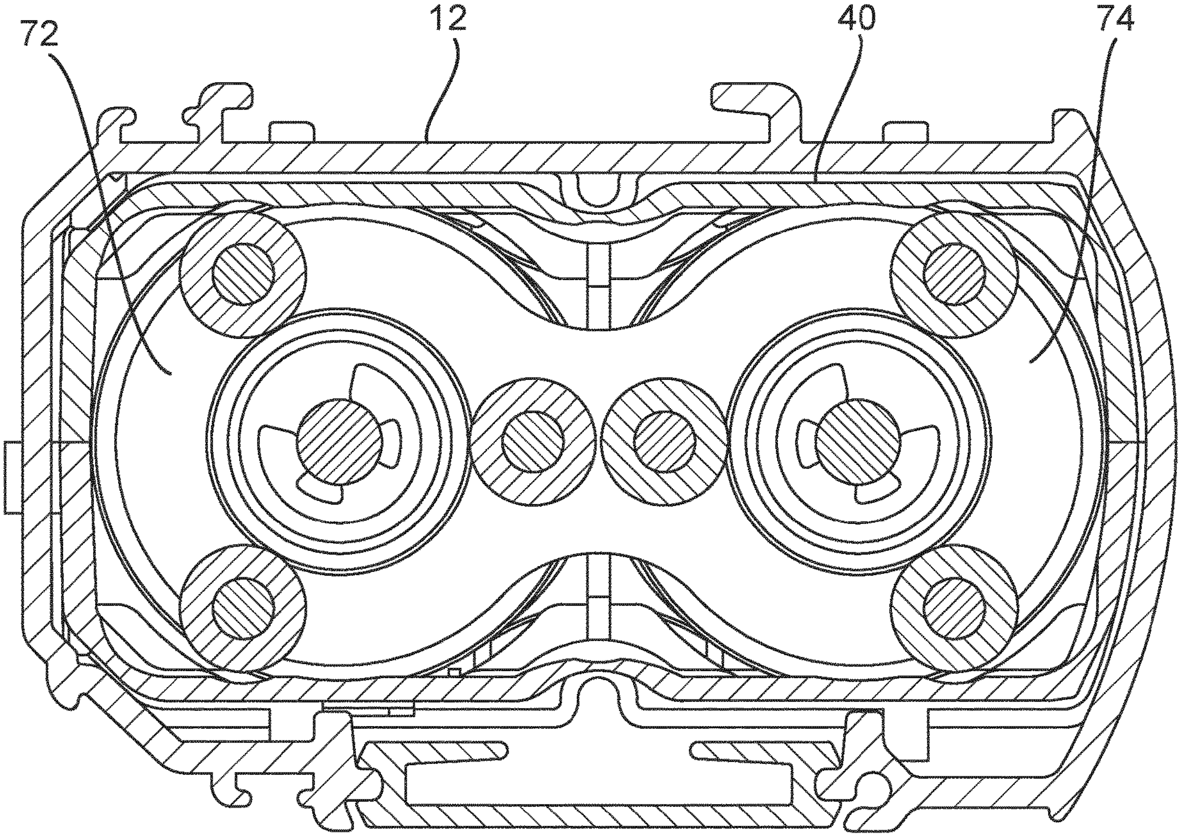
Figure 7A:
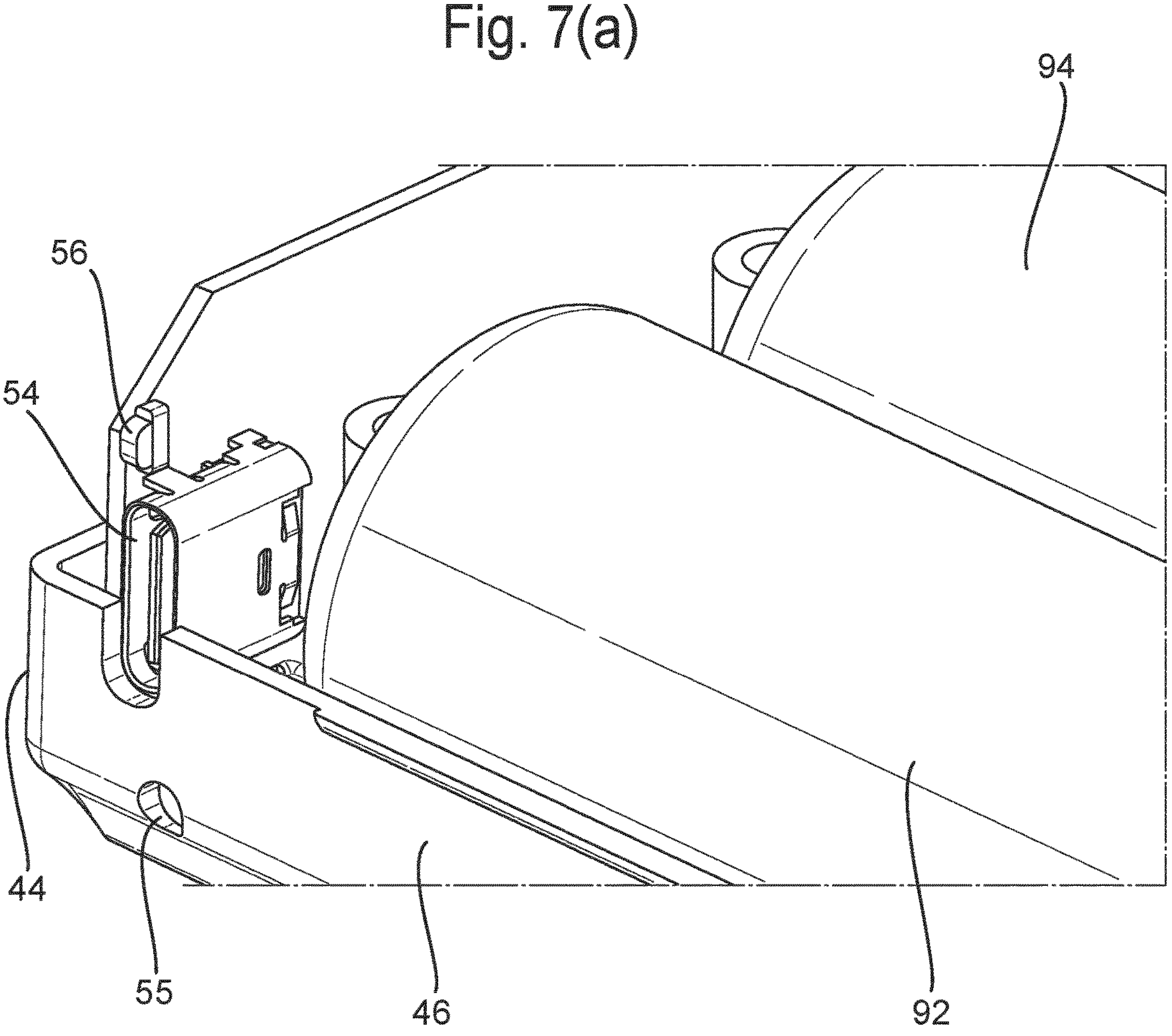
Figure 7B:
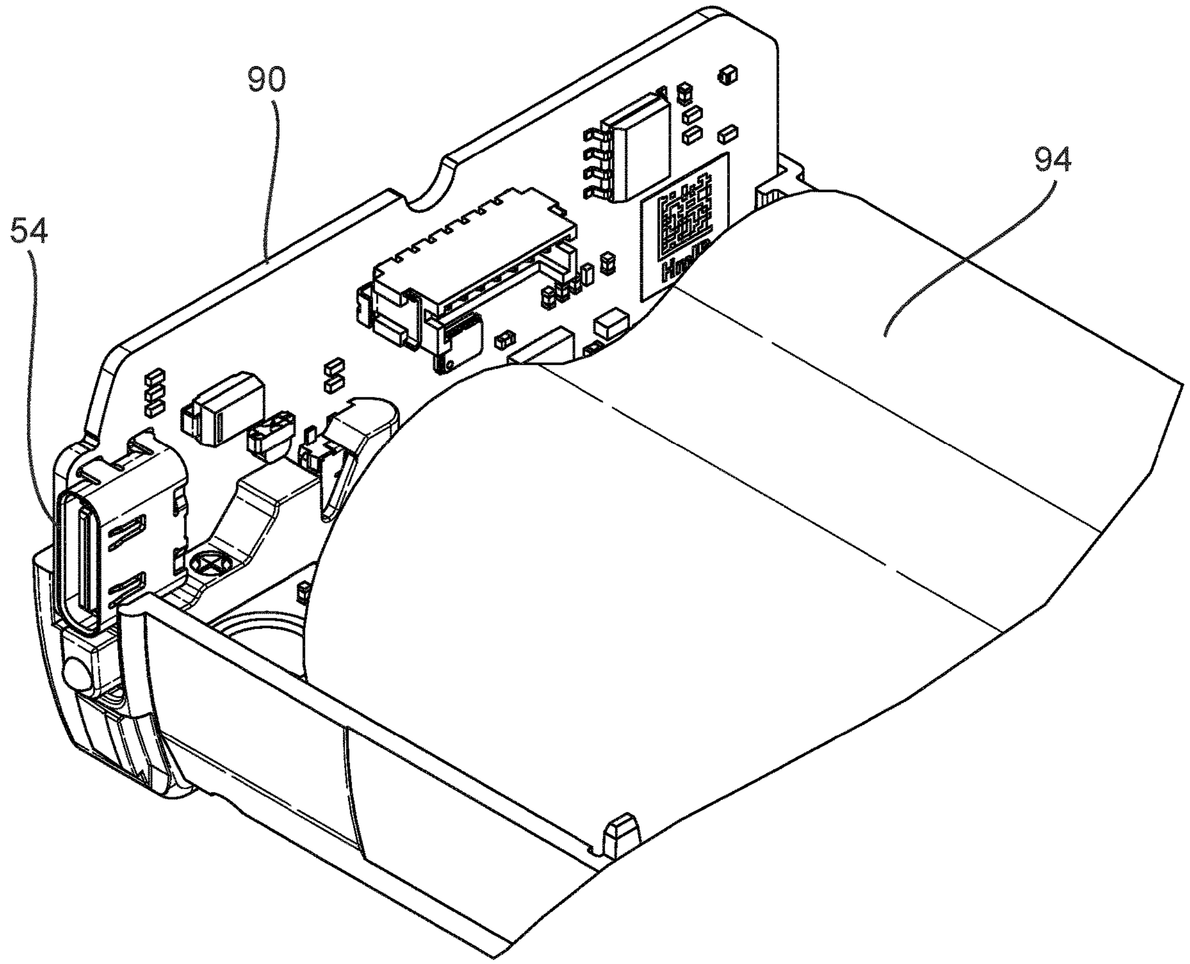
Figure 8A:
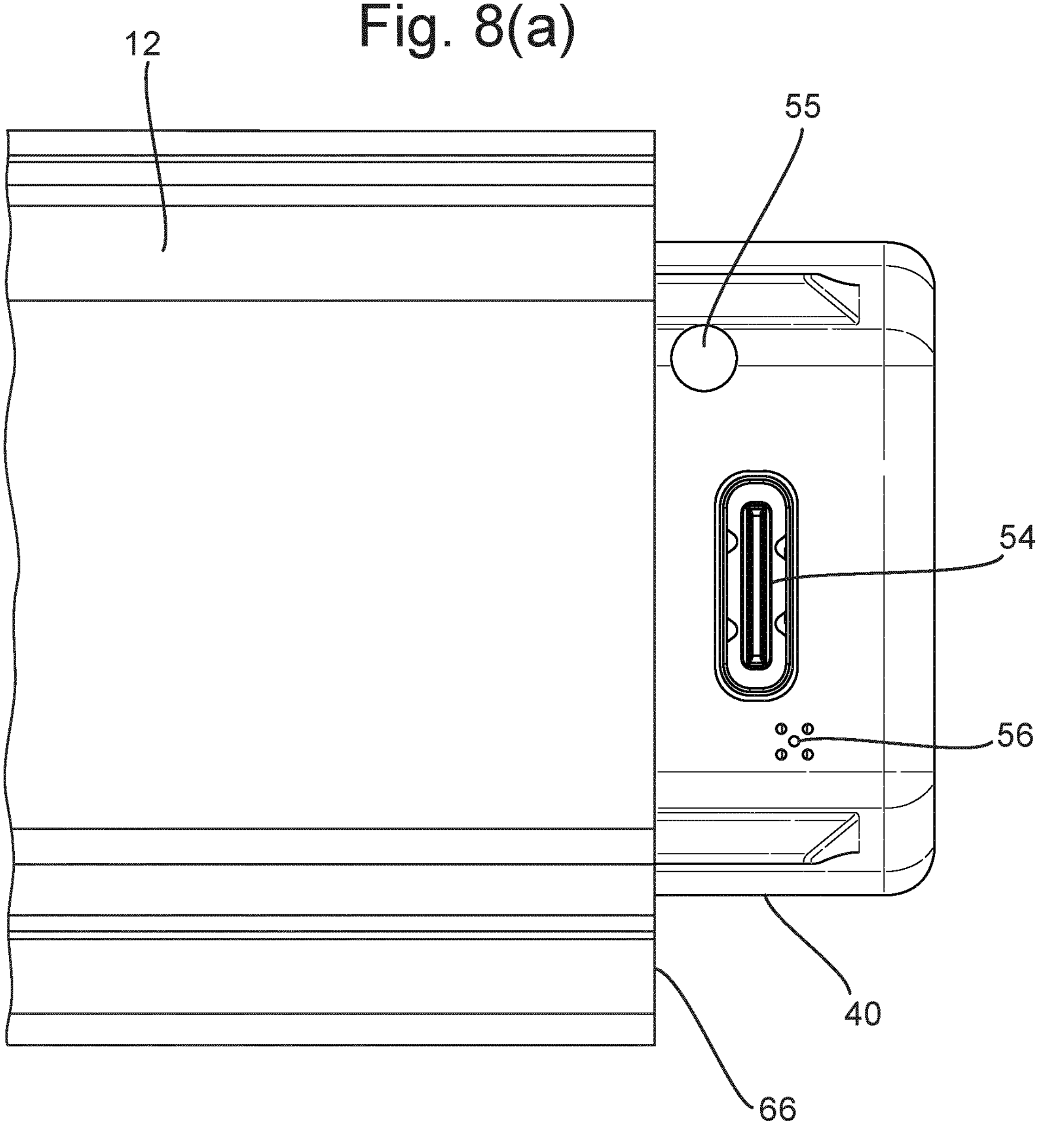
Figure 8B:
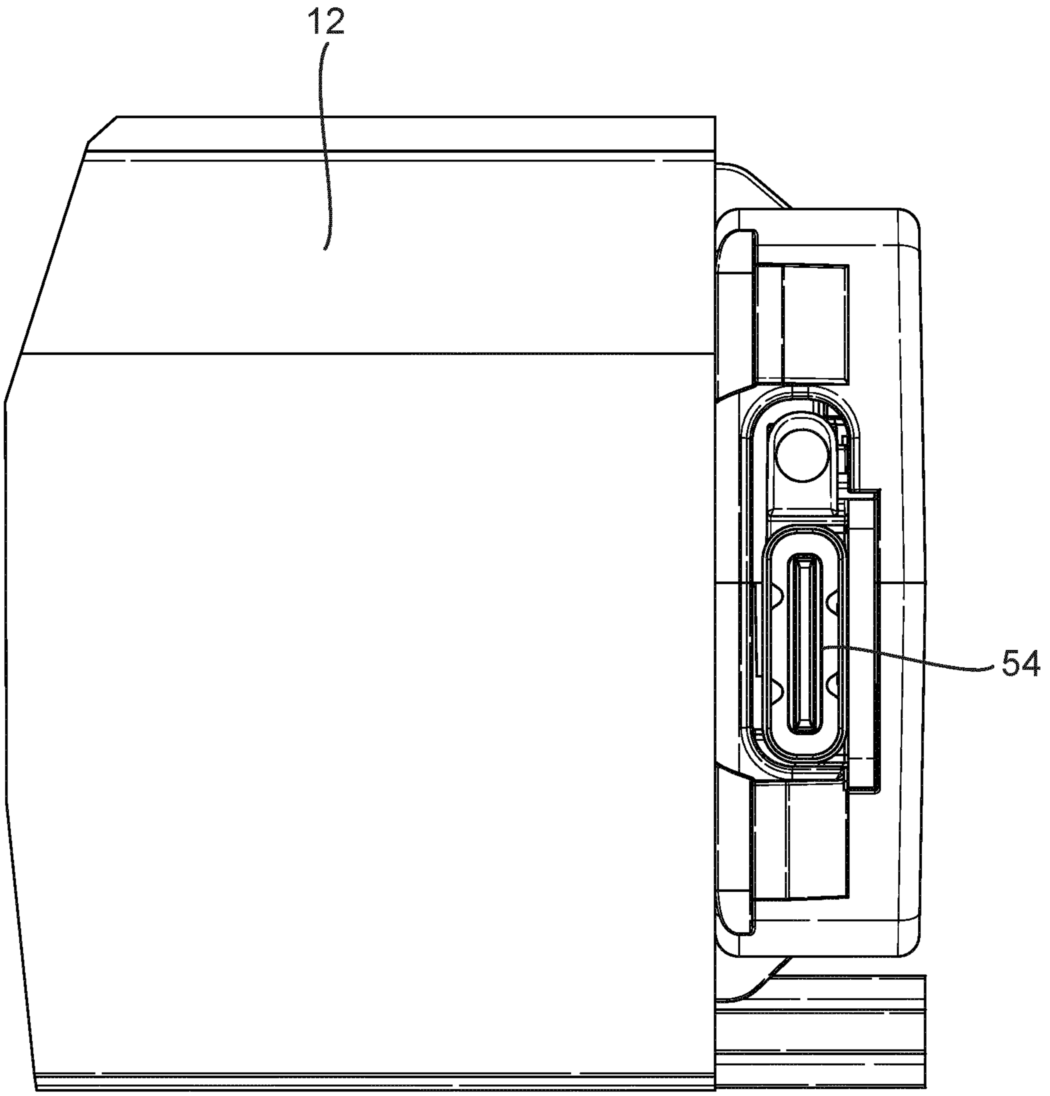
Figure 8C:
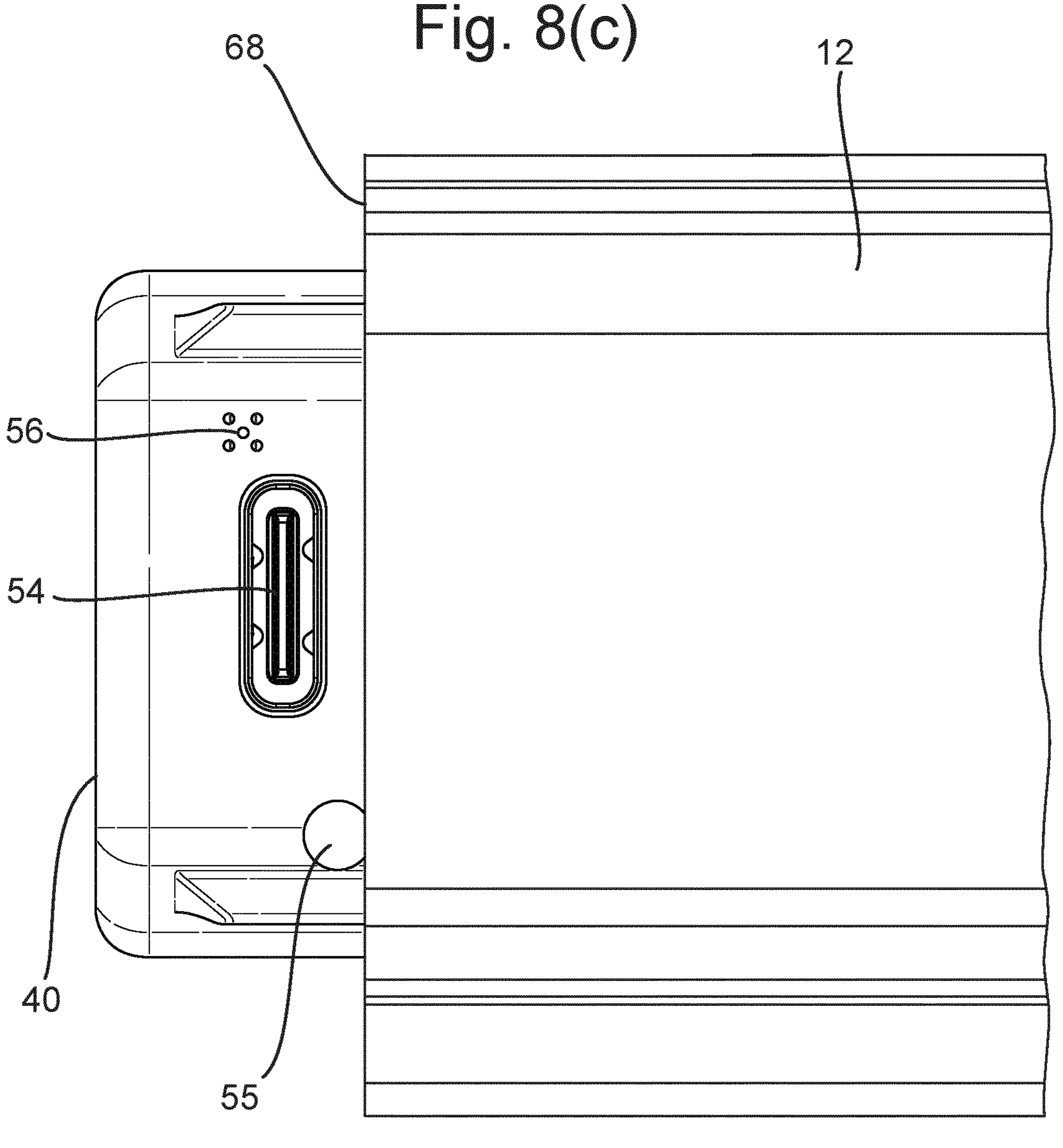
Figure 8D:
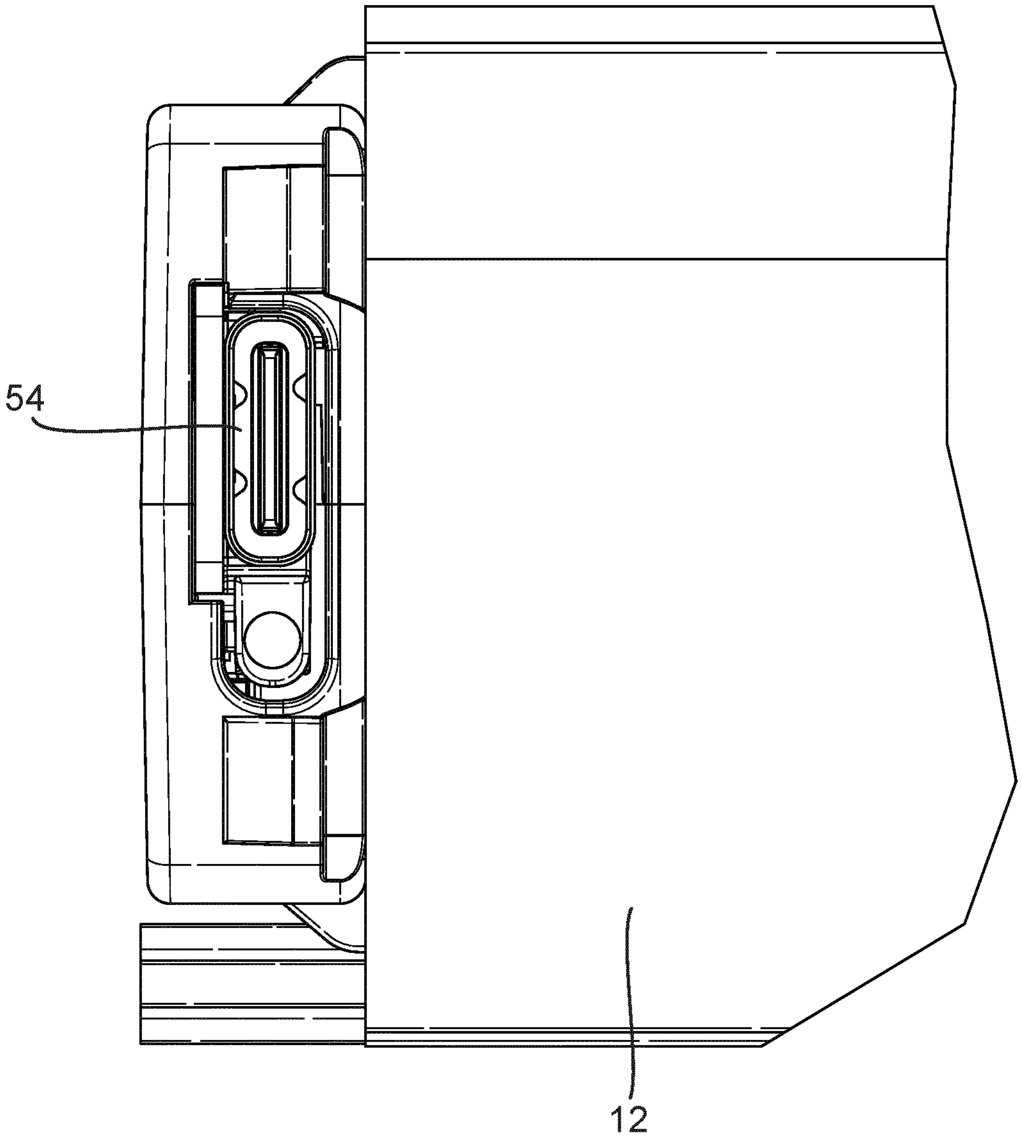
Figure 9A:
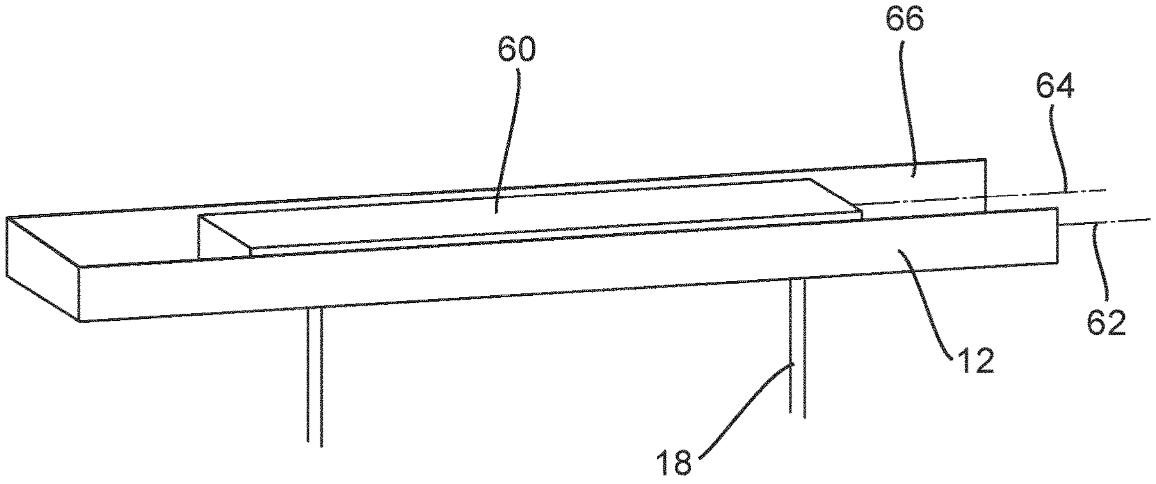
Figure 9B:
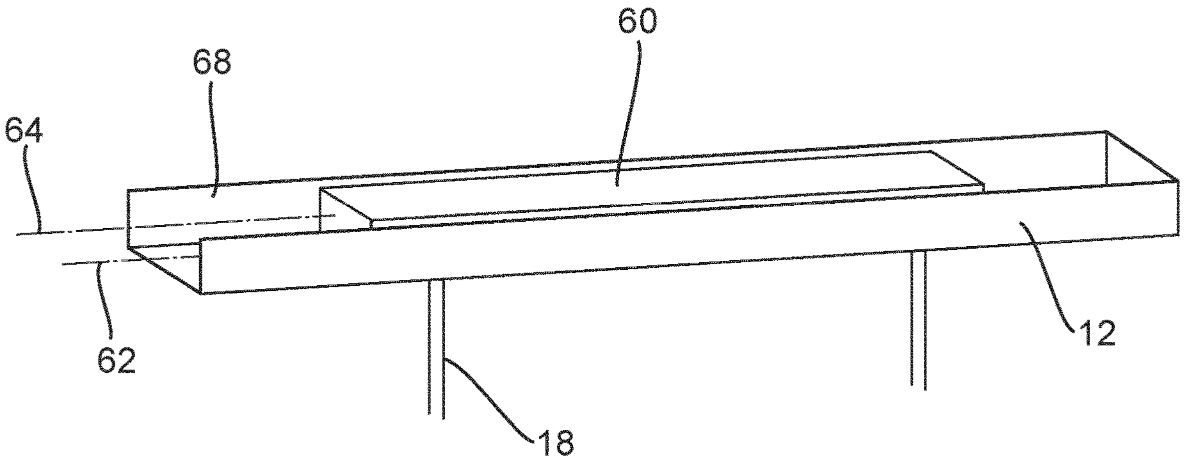

FIGS. 5(*a*), (*b*), (*c*) and (*d*) illustrate a motor assembly with part of the housing removed;

FIGS. 6(*a*) and (*b*) illustrate a cross-section through a motor assembly fitted within a rail;

FIGS. 7(*a*) and (*b*) illustrate details of one end of the motor assembly;

FIGS. 8(*a*) and (*b*) and (*c*) and (*d*) illustrate the motor assembly fitted to opposite ends of a rail; and FIGS. 9(*a*) and (*b*) illustrate rails of an architectural opening covering system for receiving the motor assembly.

The following description relates to an example of installing the motor assembly of the present invention in a top down/bottom up architectural opening covering system such as described in WO 2012/109147. However, it will be appreciated that the motor assembly could similarly be installed in other architectural opening covering systems requiring the use of two motors for driving extension and/or retraction of coverings.

Figure 1:
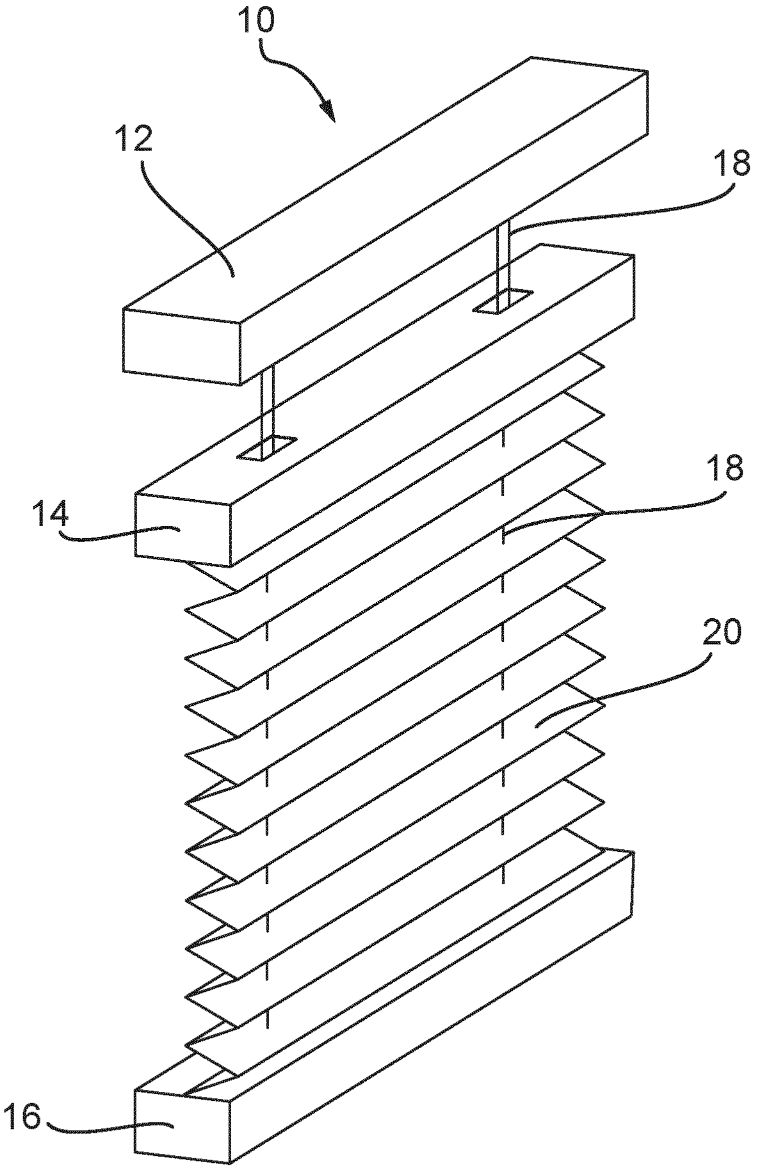
Figure 2A:
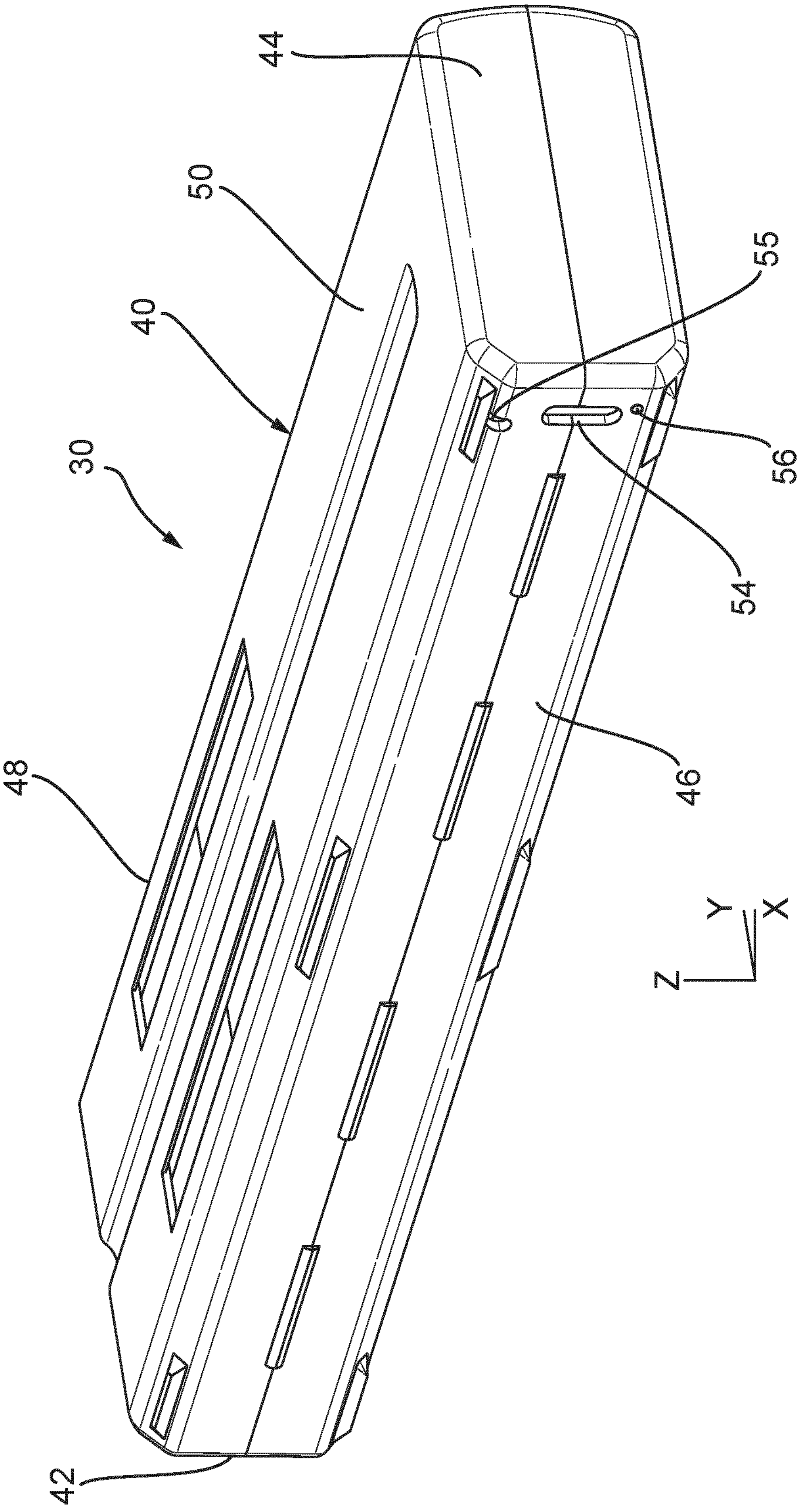
Figure 2B:
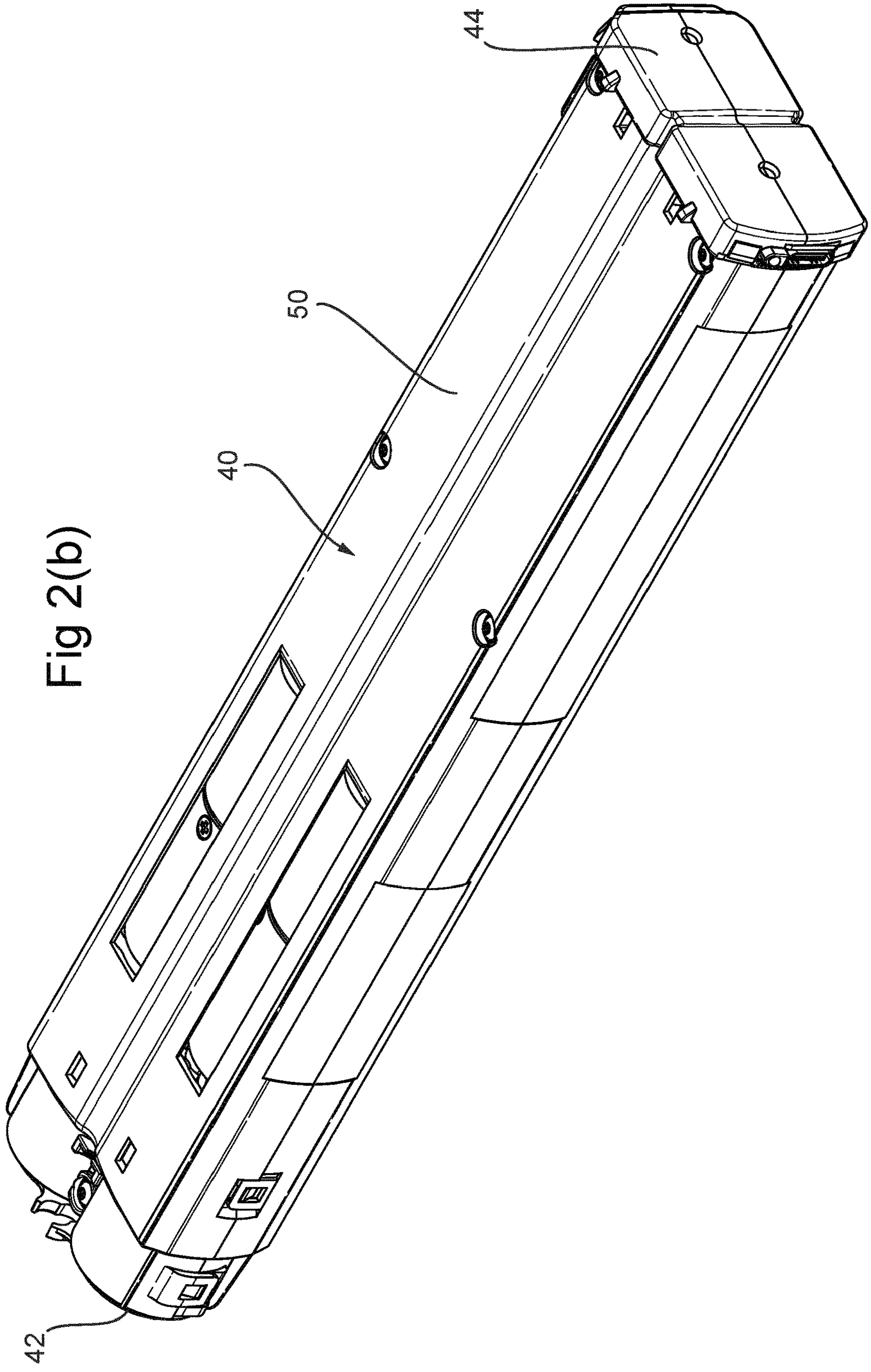
Figure 2C:
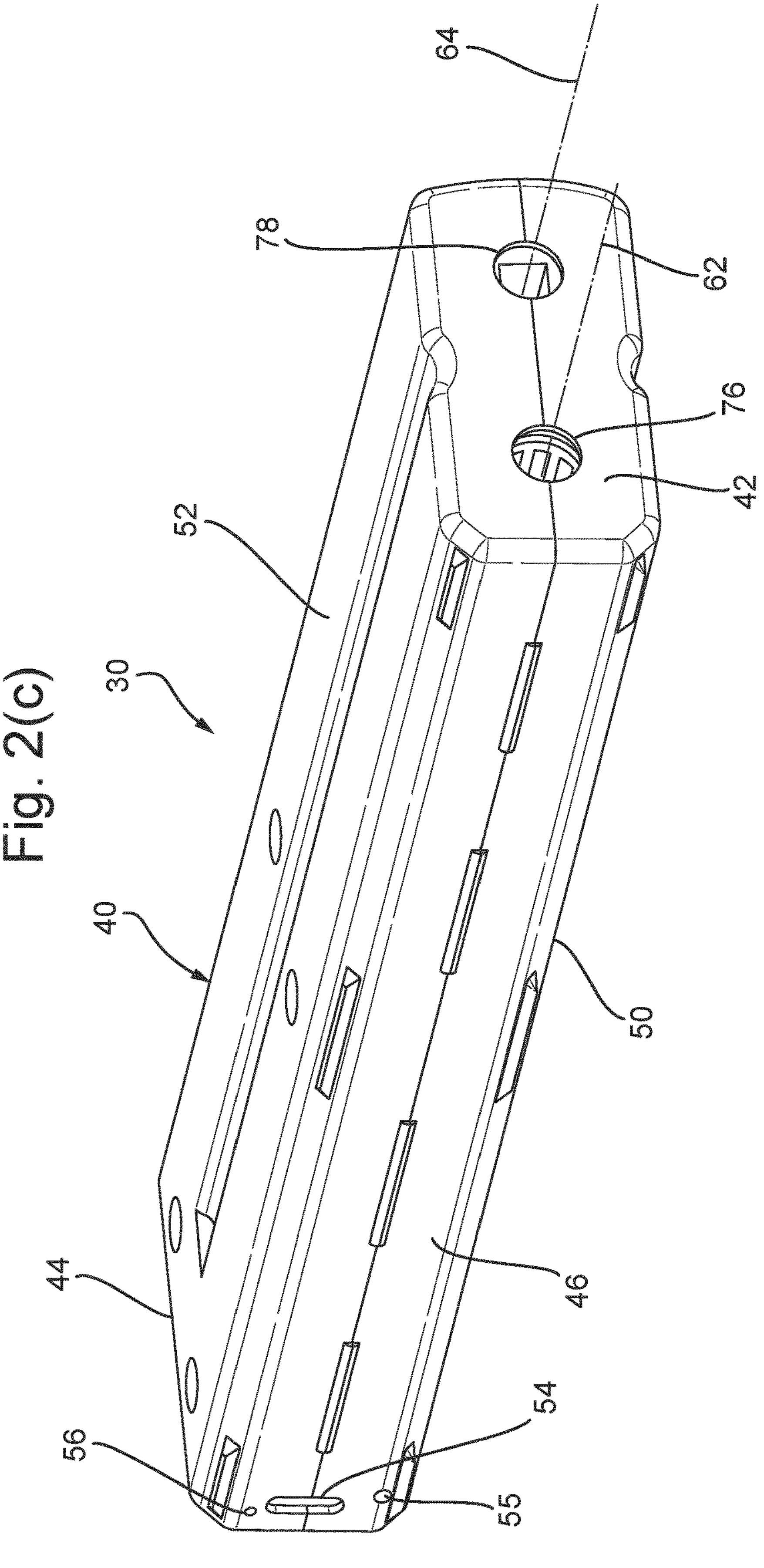
Figure 2D:
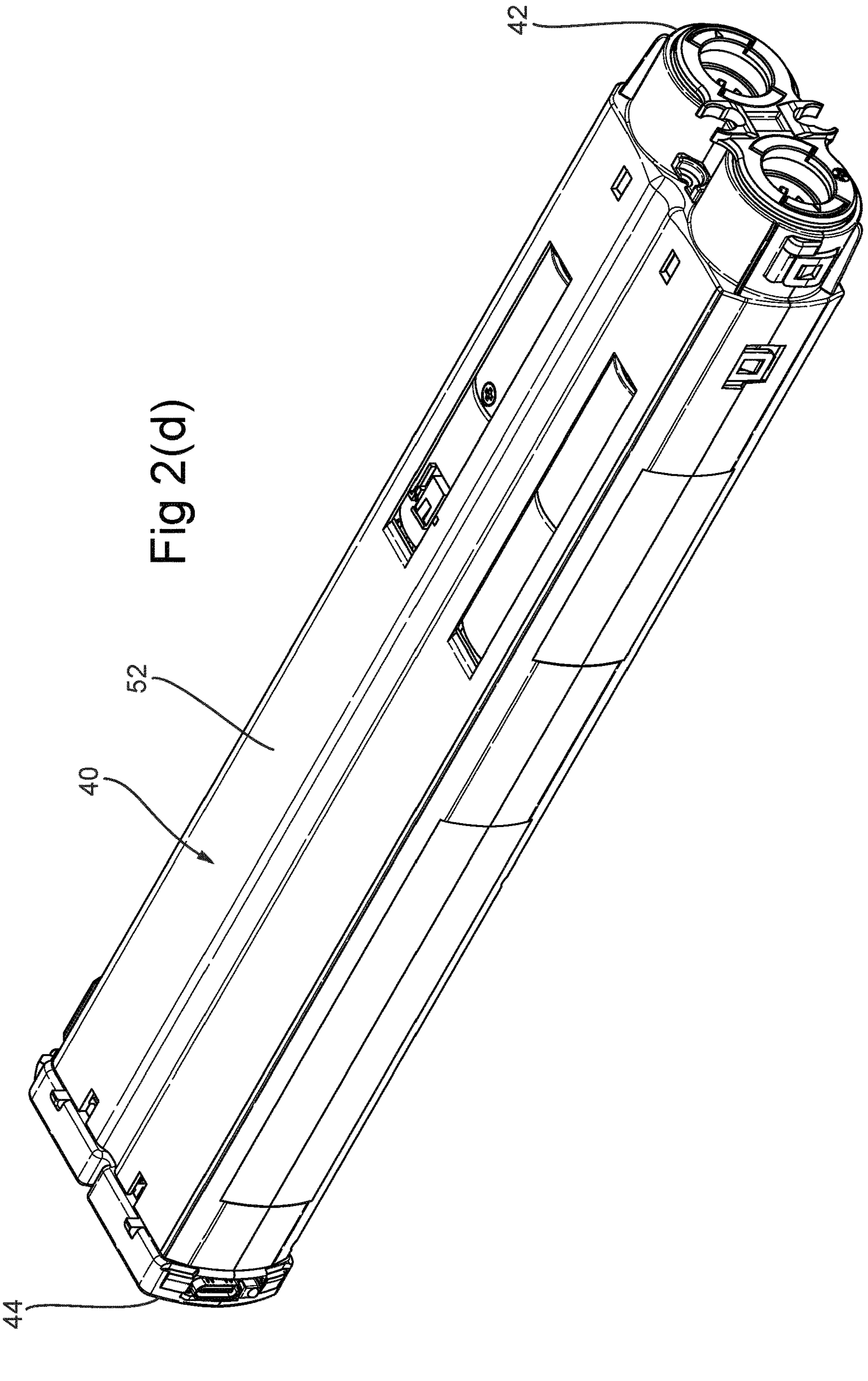

FIG. 1 illustrates an example architectural opening covering system 10 taking the form of a top down/bottom up architectural opening covering system. It is mountable at an architectural opening (not shown) to allow the covering to be drawn up and/or down relative to the architectural openings lower and upper portions. As shown in FIG. 1, the architectural opening covering system 10 includes a top rail 12, a middle rail 14 and a bottom rail 16. The top rail 12 is a fixed rail and the middle rail 14 and the bottom rail 16 are movable. In the illustrated example, the top rail 12 is fixedly mountable to a wall or framing (not shown) surrounding an architectural opening (not shown). The top rail 12 houses master and slave motors, together with control circuitry controlling actuations of the middle rail 14 and the bottom rail 16 to expose less or more of the top and/or bottom portions of the architectural opening.

As shown in the illustrated example, the middle rail 14 and the bottom rail 16 are connected through lift cords 18 to the top rail 12. Lift cords 18 enable lowering and raising of the middle rail 14 and the bottom rail 16. In operation, the middle rail 14 is movable independent of the bottom rail 16 relative to the top rail 12, and the bottom rail 16 is movable independent of the middle rail 14 relative to the top rail 12. In this manner, a covering 20 (such as a fabric, blind etc.) disposed between the middle rail 14 and the bottom rail 16 can be raised from the bottom towards the top by selectively and independently moving the bottom rail 16. The covering 20 can also be lowered from the top towards the bottom by selectively and independently moving the middle rail 14. Selectively moving the middle rail 14 and the bottom rail 16 relative to one another in this manner causes the covering 20 to extend and retract over different portions of a corresponding architectural opening to expose less or more of the architectural opening.

A master motor (to be described below) may be provided in the top rail 12 to enable movement of the middle rail 14 and, similarly, a slave motor (to be described below) may be provided in the top rail 12 to enable movement of the bottom rail 16. Also, appropriate control circuitry and/or a power source may be provided in the top rail 12.

Top down/bottom up covering arrangements are well known. Hence, no discussion is required herein of the various spool arrangements possible for extending and retracting the lift cords 18 for moving the middle rail 14 and bottom rail 16. It is sufficient to understand that the top rail 12 houses a master motor and a slave motor having respectively a master drive axis and a slave drive axis providing respective rotational drive to appropriate arrangements for controlling the lift cords 18.

FIGS. 2(*a*) and (*c*) and FIGS. 2(*b*) and (*d*) illustrate respective motor assemblies respectively in a first orientation and a second orientation.

As illustrated, the motor assembly 30 has a modular form and is self-contained in a housing 40. The housing 40 extends in a longitudinal direction X, a lateral direction Y and another lateral direction Z. In particular, it extends in the longitudinal direction X from a first end 42 to a second end 44, it extends in the lateral direction from a front surface 46 and a rear surface 48, and it extends in the another lateral direction Z between a top surface 50 and a bottom surface 52. Comparing the first orientation of FIGS. 2(*a*) and (*c*) and the second orientation of FIGS. 2(*b*) and (*d*), it will be noted that the first and second ends 42, 44 are reversed and the top and bottom surfaces 50, 52 are reversed, but the front surface 46 remains facing in the same direction and the rear surface 48 remains facing in the same direction. As will be described in detail below, this ensures that the drive axes of the housed motors remain in the same positions for engagement with other features of the architectural opening covering system.

FIGS. 2(*a*) to (*d*) also illustrate the provision of a connector port 54, such as a USB-C connector socket, a button 55 and an LED 56 in the front surface 46 of the housing 40. Because the front surface 46 remains facing in the same direction irrespective of whether the housing is installed in the first orientation of FIGS. 2(*a*) and (*c*) or the second orientation of FIGS. 2(*b*) and (*d*), these features of the user interface will always remain available to the user. As illustrated, the connector port 54, button 55 and LED 56 are provided towards the second end 44 of the housing 40.

Figure 3:
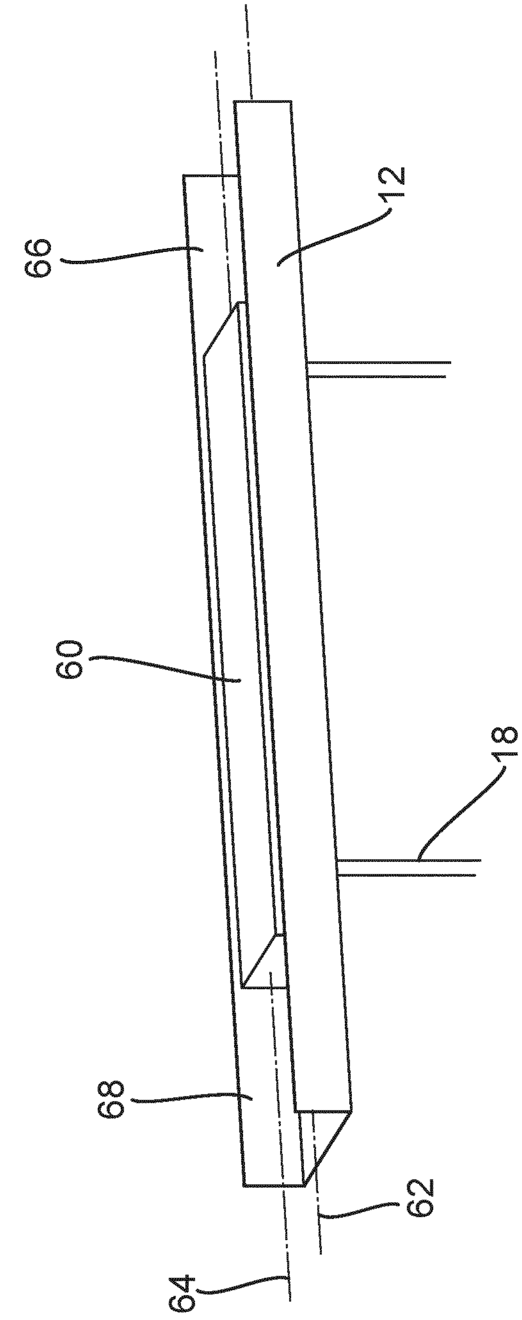
FIG. 3 illustrates a rail of an architectural opening covering system for receiving the motor assembly.

FIG. 3 illustrates schematically a lower part of one example of the top rail 12 of FIG. 1 with the top part cut away.

Illustrated as a schematic block 60, various spool and cord components are provided as a drive assembly for controlling the lift cords 18. These various components of the drive assembly 60 require only rotational drive about a master drive axis 62 and rotational drive about a parallel slave drive axis 64.

In the illustrated arrangement of FIG. 3, each end of the top rail 12 is configured to support the motor assembly 30. In particular, the motor assembly 30 may be installed in and supported by a first end 66 of the top rail 12 when in the first orientation of FIGS. 2(*a*) and (*c*). It may also be arranged in and supported by the opposite second end 68 of the top rail 12 when in the second orientation of FIGS. 2(*b*) and (*d*). Actually, the top rail 12 may have a constant/uniform profile cross-section (for example, it may been constructed as an extrusion) and so may have a configuration to support the motor assembly 30 at any point along the length of the top rail 12.

FIG. 3 illustrates a convenient arrangement in which a drive assembly extends directly over lift cord openings. However, it is also possible for the drive assembly 60 to be longitudinally offset from at least one of the lift cord openings. Appropriate guides may be provided for the cords. With such an arrangement, lift cords can be guided underneath the motor assembly 30 to the respective lift cord openings. With lift cords running under the motor, it is possible to provide the spool and a cord or cords that run through the fabric to be accommodated regardless of the position of the motor. By locating the drive assembly 60 and corresponding cord spools away from the lift cord openings, space may be provided at the end of the rail for other hardware, such as the motor assembly 30 as discussed here.

Figure 4:
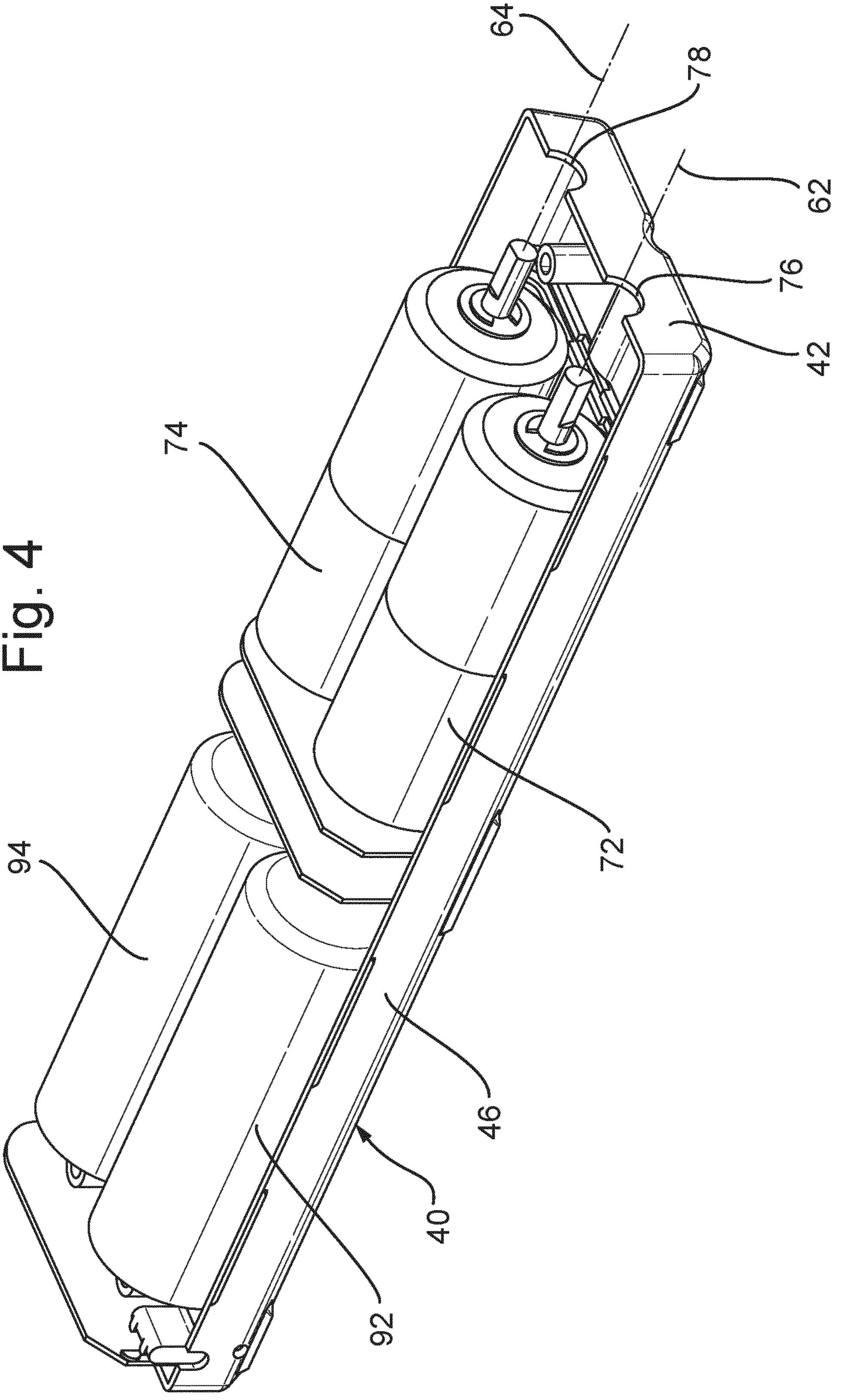
FIG. 4 illustrates a motor assembly with part of the housing removed.
Figure 5A:
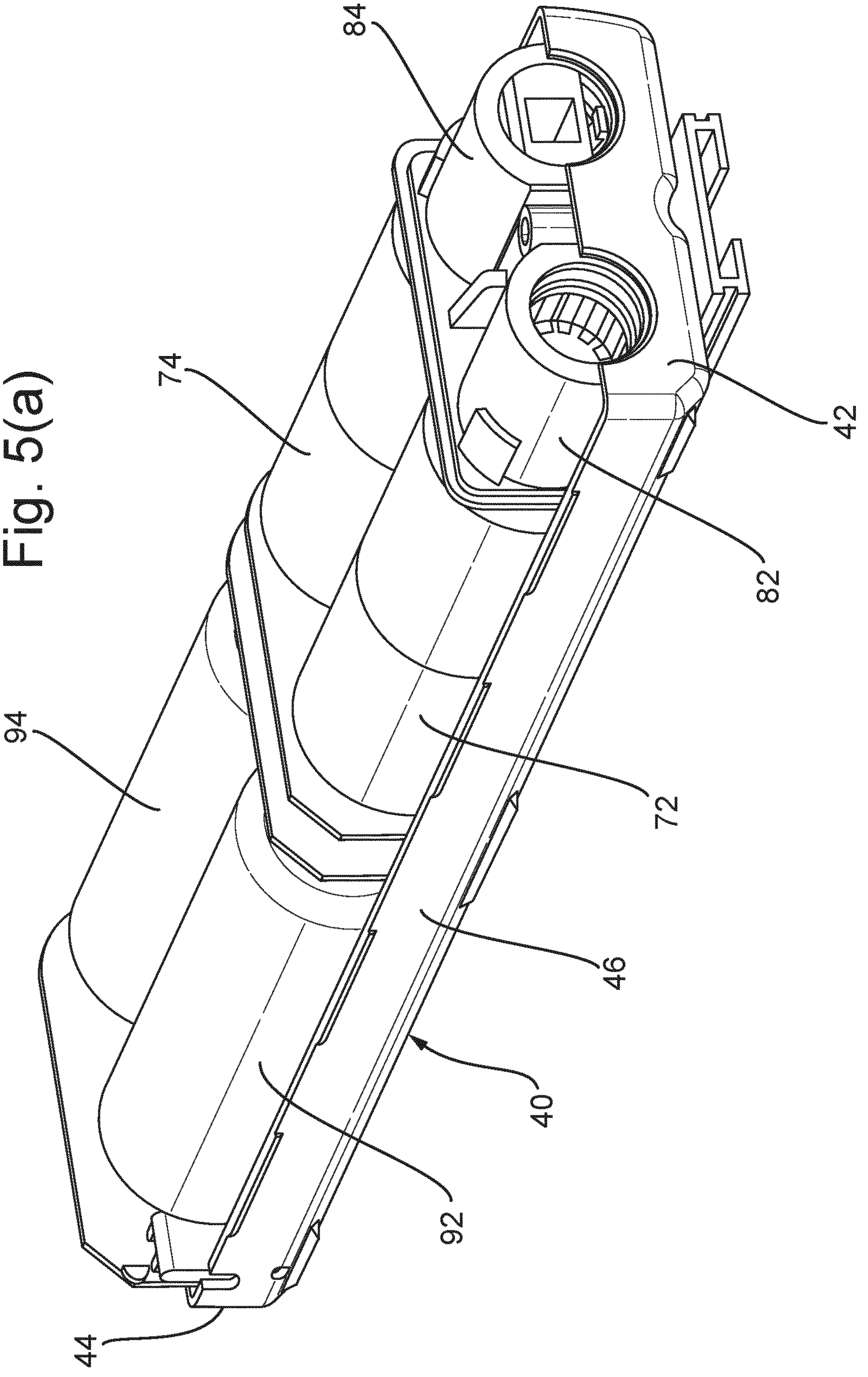
Figure 5B:
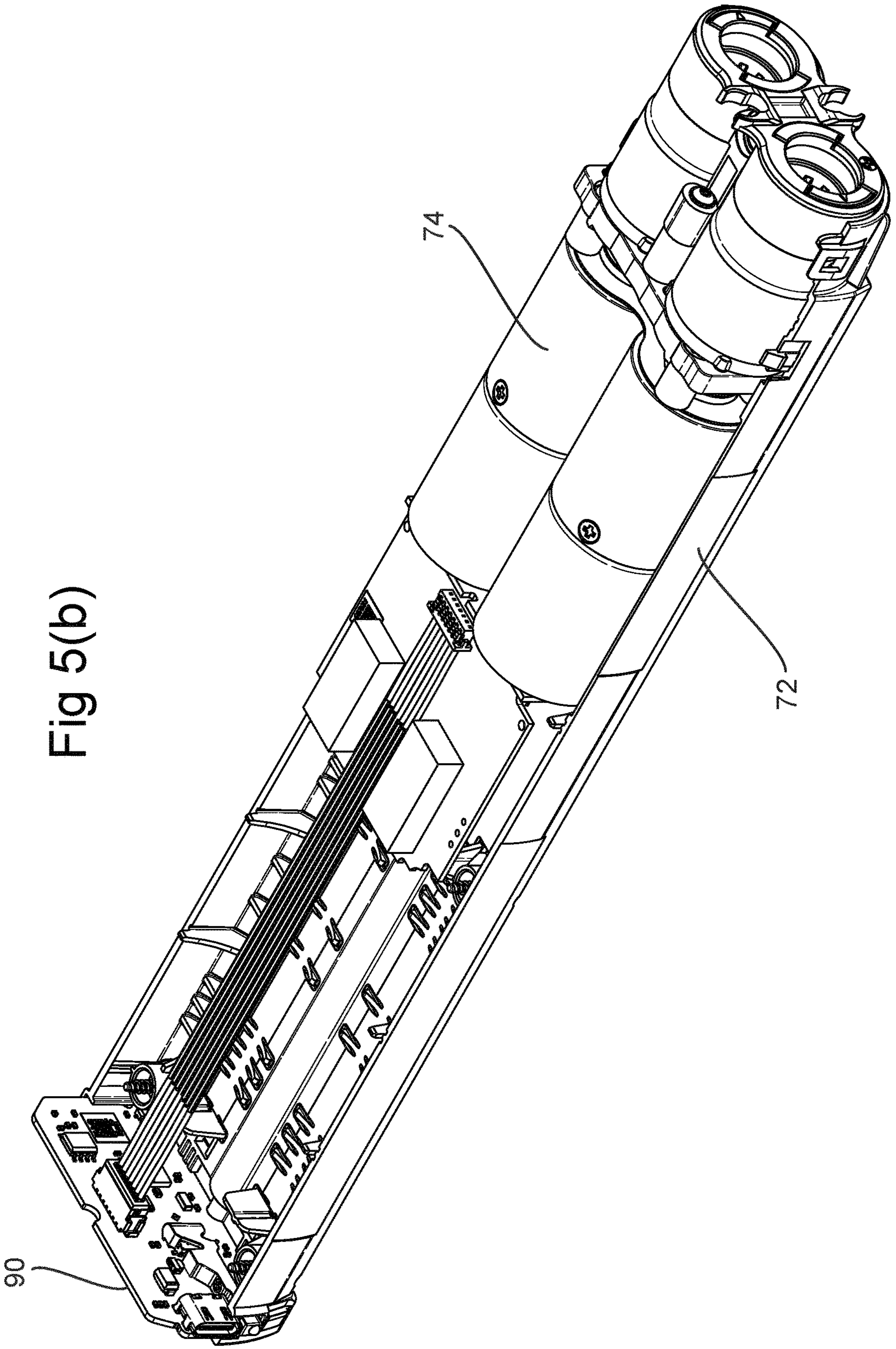
Figure 5C:
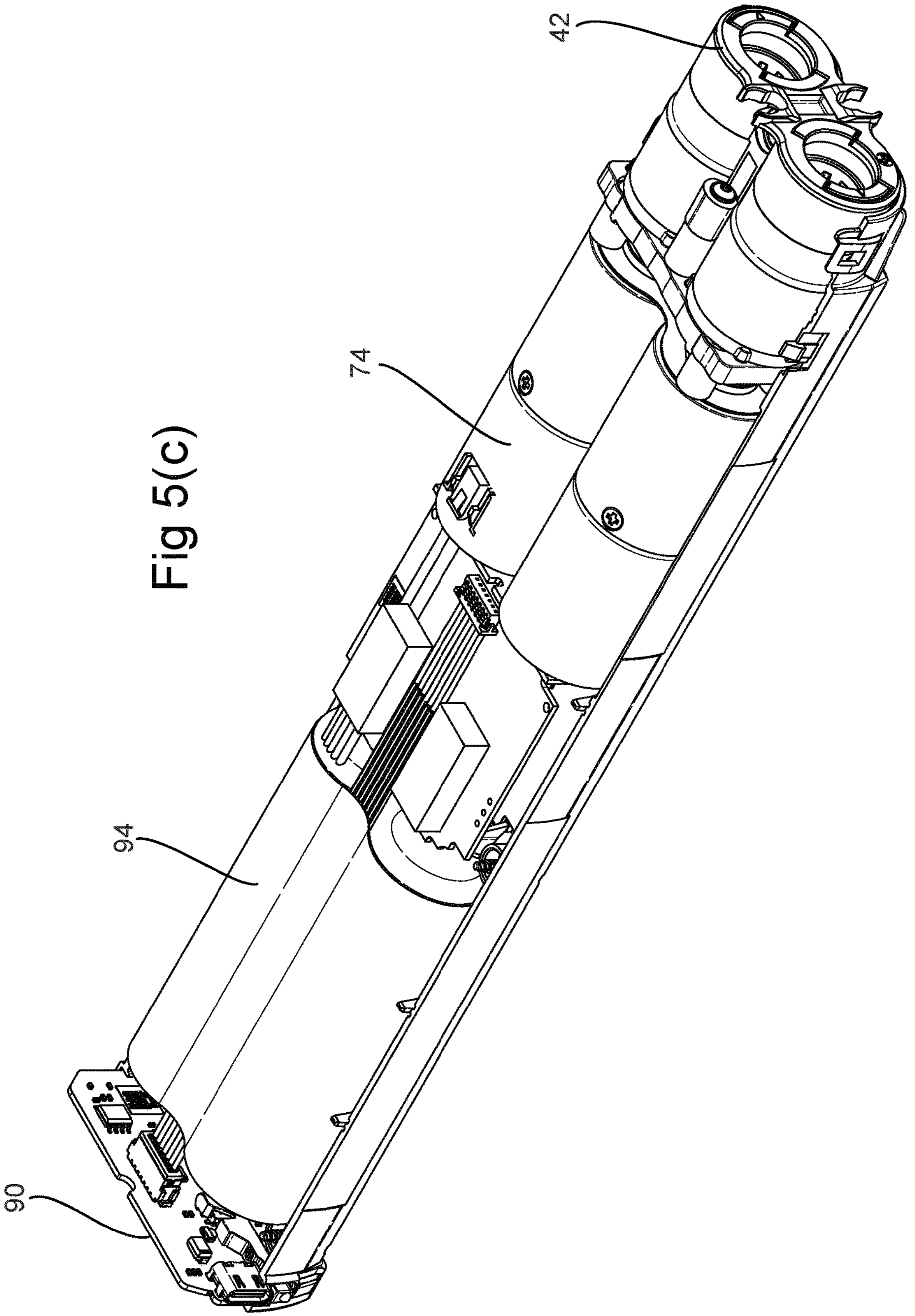
Figure 5D:
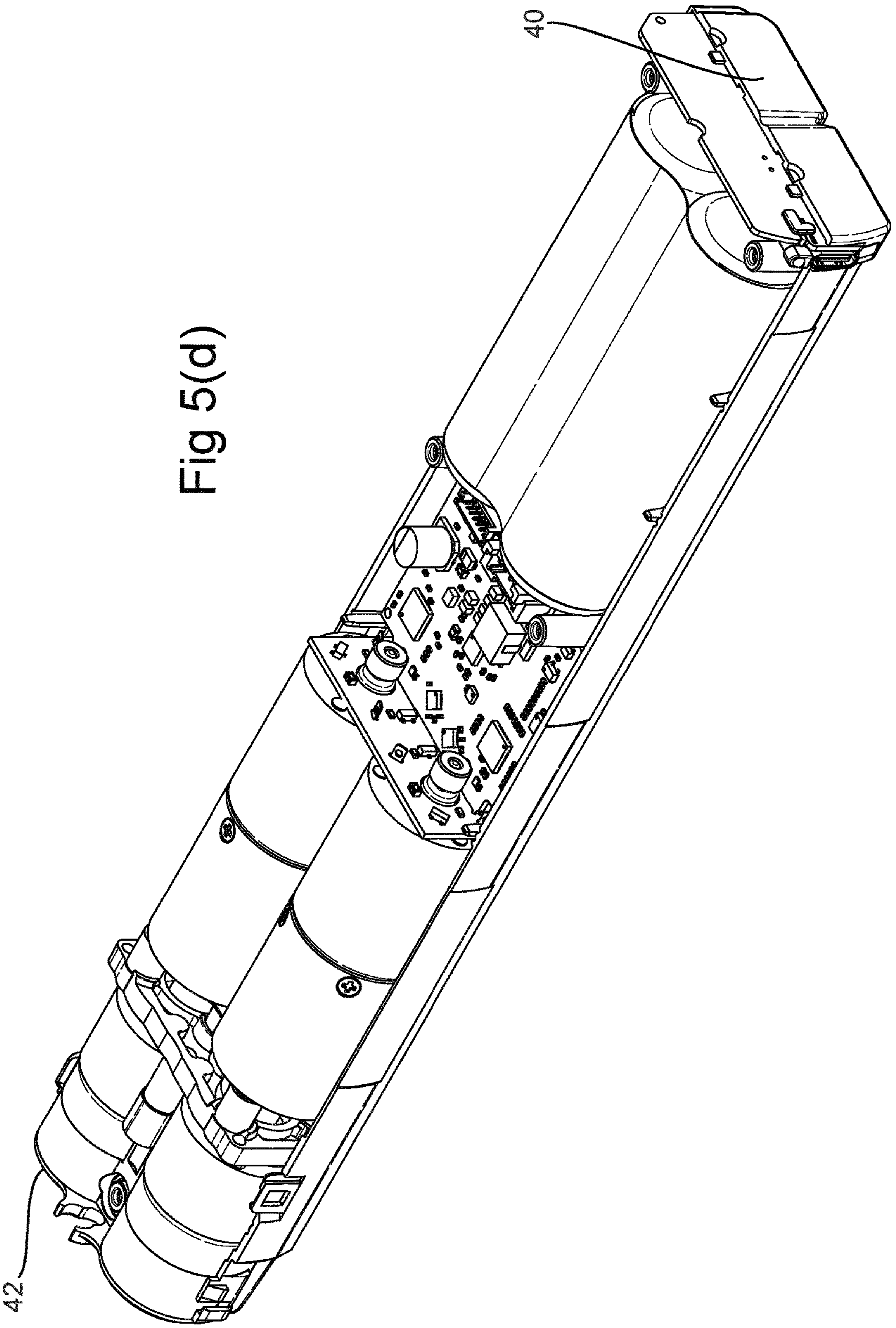

FIG. 4 illustrates a cut away of the motor assembly 30 in the second orientation of FIGS. 2(*b*) and (*d*). As illustrated, the motor assembly 30 includes a master motor 72 providing rotational drive about a master drive axis 62 and a slave motor 74 providing rotational drive about a slave drive axis 64. The master motor 72 and slave motor 74 are supported within the housing 40 side-by-side in the lateral direction Y with the master motor towards the front surface 46. As illustrated in FIG. 2(*b*), at the first end 42, respective openings 76 and 78 are provided on the master drive axis 62 and slave drive axis 64 allowing rotational drive from the master motor 72 and slave motor 74 to be transferred outside the housing 40 of the motor assembly 30.

FIG. 5(*a*) illustrates an example of the inside of the first end 42 of the housing 40 in which coupling components 82 and 84 are provided respectively on the shaft of the master motor 72 and slave motor 74. The coupling components 82, 84 are configured to engage with respective shafts of the drive assembly 60 to provide rotational drive to the drive assembly 60. As illustrated, the respective coupling components 82, 84 may have different profiles for engaging with different respective shafts of the drive assembly 60. By providing different profiles, it can be ensured that the motor assembly 30 always engages with the appropriate shafts of the drive assembly 60. In other words, it is ensured that the master motor drives an appropriate shaft of the drive assembly 60 and the slave motor drives the appropriate features of the drive assembly 60.

The motor assembly includes control circuitry configured to control operation of the master motor and the slave motor. This control circuitry may be responsive to features such as the button 55 and LED 56. Communication may be achieved with the control circuitry via the connector port 54. Also, the connector port 54 may be used to provide power for recharging the power storage of the motor assembly 30. The control circuitry may be provided on one or more printed circuit boards. In the illustrated arrangement, the control circuitry is spread between three printed circuit boards 86, 88 and 90. The printed circuit boards 86 and 88 may be used to control the motors, whereas the printed circuit board 90 may be used as part of the user interface. As illustrated in FIG. 7, the connector port 54, button 55 and LED 56 may be mounted directly on the printed circuit board 90.

In summary, then, the motor assembly 30 may be installed at the first end 66 of the top rail 12 in the first orientation of FIGS. 2(*a*) and (*b*) with the first end 42 of the housing 40 facing inwardly of the top rail 12 towards the drive assembly 60. Alternatively, the motor assembly 30 may be installed at the second end 68 of the top rail 12 similarly with the first end 42 of the housing 40 facing inwardly of the top rail 12 towards the drive assembly 60. In both supported arrangements, the master drive axis 62 and slave drive axis 64 are located in the same positions within the top rail 12 and, hence, can drive the drive assembly 60 of the top rail 12 in the same way.

The housing 40 of the motor assembly 30 has an external shape and size which can be supported at either end 66 or 68 of the top rail 12 in the first orientation or second orientation respectively. It includes features such that this is achieved. Similarly, the surface of the top rail 12 has a shape and size configured to receive the housing 40 of the motor assembly 30 in either orientation with the master drive axis 62 and slave drive axis 64 appropriately aligned.

FIGS. 6(*a*) and (*b*) illustrate cross-sections of examples of a top rail 12 containing and supporting the housing 40 of a motor assembly 30.

Returning to FIG. 4 and FIGS. 5(*a*) to (*d*), it will be seen that the motor assembly 30 also includes batteries 92 and 94 as power storage within the housing 40. While the master motor 72 and slave motor 74 are provided towards the first end 42 of the housing and provide drive out through the first end 42 of the housing 40, the power storage may be provided towards the second end 44 of the housing 40. As illustrated the power storage is arranged at a position spaced from the master motor 72 and slave motor 74 in the longitudinal direction X towards the second end 44 of the housing 40. Where, as illustrated, a pair of batteries 92 and 94 are provided as power storage, these may be axially aligned with the master drive axis 62 and slave drive axis 64.

As discussed above, the motor assembly 30 may include a connector port 54, a button 55 and a LED 56. It may alternatively or additionally be provided with other user interface components. In the illustrated arrangement, the connector port 54, button 55 and LED 56 are provided in the front surface 46 towards the second end 44 of the housing 40. These are illustrated in greater detail in the cut aways of FIGS. 7(*a*) and (*b*).

As illustrated in FIGS. 8(*a*) and (*b*), when the motor assembly 30 is installed at the first end 66 of the top rail 12, the connector 54, button 55 and LED 56 of the user interface are provided towards or beyond the furthest extent of the first end 66 of the first rail 12. Similarly, as illustrated in FIGS. 8(*c*) and (*d*), when the motor assembly 30 is installed at the second end 68 of the top rail 12, the connector 54, button 55 and LED 56 are provided towards or beyond the furthest extent of the second end 68 of the first rail 12.

The top rail 12 may be configured to support the housing 40 of the motor assembly 30 extending beyond the top rail 12 as illustrated in FIG. 8(*a*) to (*d*). Alternatively, the ends 66 and 68 of the top rail 12 may include openings allowing access/viewing of the connector port 54, button and LED 56. For example, the top rail 12 may be provided with an end cap to be fitted to the end of the top rail 12, but having appropriate openings for features of the user interface.

In one arrangement, motor assembly 30 may be attached to the top rail 12 by means of an adaptor piece which, for example may be resiliently affixed (clicked) onto the motor assembly 30 from either side. The adaptor can be connected to the top rail 12 with a screw. The end piece of the motor may then, as mentioned above, be covered with an end cap. Of course, therefore, the top rail 12 itself will have a slightly shorter extent on the motor assembly side.

The example of the first rail 12 described above in relation to FIG. 3 allows installation of a motor assembly 30 at either end 66, 68 such that the first or top rail 12 may be used with a motor assembly 30 at either end. However, it should be appreciated that the motor assembly 30 is also useful in conjunction with separate first rails 12 as illustrated in FIGS. 9(*a*) and 9(*b*) which are intended respectively for use with a motor assembly 30 either at the first end 66 as illustrated in FIG. 9(*a*) or at the second end 68 as illustrated in FIG. 9(*b*). Such first rails are still able to make use of the same modular motor assembly 30 and thereby increase manufacturing efficiency.

The invention claimed is:

1. A motor assembly for an architectural opening covering system having a covering and having a rail with a lift mechanism for the covering, the lift mechanism extending in a longitudinal direction between a first mechanism end and a second mechanism end and being positioned between one end and another end of the rail, the motor assembly including:

- a master motor for providing rotational drive about a master drive axis;
- a slave motor for providing rotational drive about a slave drive axis;
- power storage for storing electrical energy for powering the master motor and the slave motor; and
- control circuitry configured to control operation of the master motor and the slave motor using the electrical energy stored in the power storage; wherein:
- the motor assembly further includes a housing which houses the master motor, the slave motor, the power storage and the control circuitry, the housing extending in the longitudinal direction between a first end and a second end;
- the master motor and the slave motor are arranged at the first end of the housing side-by-side in a lateral direction perpendicular to the longitudinal direction, the master drive axis and the slave drive axis being parallel to the longitudinal direction;
- the power storage is arranged in the housing at a position spaced from the master motor and the slave motor in the longitudinal direction towards the second end of the housing; and
- the housing has an external shape and size configured to be supported: (1) adjacent to the one end of the rail of the architectural opening covering system in a first orientation with the first end of the housing facing towards the other end of the rail and the first mechanism end of the lift mechanism; and (2) adjacent to the other end of the rail of the architectural opening covering system in a second orientation, opposite to the first orientation, with the first end of the housing facing towards the one end of the rail and the second mechanism end of the lift mechanism.

2. A motor assembly according to claim 1, wherein the control circuitry includes a printed circuit board positioned between the power storage and the master and slave motor in the longitudinal direction.

3. A motor assembly according to claim 1, wherein the power storage includes a battery.

4. A motor assembly according to claim 1, wherein the housing extends in the lateral direction between a front surface and a rear surface.

5. A motor assembly according to claim 4, wherein the master motor is arranged adjacent the front surface and the slave motor is arranged adjacent the rear surface.

6. A motor assembly according to claim 4, further including, connected with the control circuitry and provided in the front surface of the housing, at least one of an LED, a connector port or a button.

7. A motor assembly according to claim 6, wherein the at least one of an LED, a connector port or a button is adjacent the second end of the housing.

8. A motor assembly according to claim 7, wherein:

- the control circuitry comprises a first printed circuit board to the control operation of the master motor and the slave motor using the electrical energy stored in the power storage, the first printed circuit board being positioned between the power storage and the master and slave motor in the longitudinal direction; and
- the control circuitry comprises a second printed circuit board positioned adjacent to the second end of the housing and connected with the at least one of an LED, a connector port or a button.

9. A motor assembly according to claim 7, wherein:
in both of the first and second orientations:
the front surface faces in the same direction, and
the master drive axis and the slave drive axis are located in the same positions within the rail of the architectural opening.

10. A motor assembly according to claim 4, wherein:
the housing extends in another lateral direction, also perpendicular to the longitudinal direction, between a top surface and a bottom surface; and
in both of the first and second orientations, the front surface faces in the same direction, but, in the first and second orientations respectively, the top surface faces respectively in opposite directions.

11. An architectural opening covering system, including:
a rail containing a lift mechanism for a covering, the lift mechanism extending in the longitudinal direction between a first mechanism end and a second mechanism end and being positioned between one end and another end of the rail; and
a motor assembly according to claim 1; wherein:
the rail defines an internal space between the one end and the first mechanism end, the internal space configured to support the housing of the motor assembly in the first orientation with the master motor and slave motor providing drive to the lift mechanism.

12. The architectural opening covering system of claim 11, wherein:
the system comprises another architectural opening covering system having another rail containing another lift mechanism for another covering, the other lift mechanism extending in the longitudinal direction between a first mechanism end and a second mechanism end and being positioned between one end and another end of the other rail;
the other rail of the other architectural opening covering system defines another internal space between the other end of the other rail and the second mechanism end of the other lift mechanism, the other internal space configured to support the housing of the motor assembly in the second orientation with the master motor and slave motor providing drive to the other lift mechanism; and
the motor assembly may be installed in either of the internal space of the rail or the other internal space of the other rail.

13. The architectural opening covering system of claim 11, wherein:
the rail defines an additional internal space between the other end and the second mechanism end, the additional internal space configured to support the housing of the motor assembly in the second orientation with the master motor and slave motor providing drive to the lift mechanism; and
the motor assembly may be installed in either of the one end or the other end.

14. The architectural opening covering system of claim 11, wherein the architectural opening covering system is a top up bottom down system, the rail is a top rail and the architectural opening covering system includes a middle rail and a bottom rail and a covering extending between the middle rail and the bottom rail.

15. A motor assembly according to claim 1, wherein the master motor comprises a master coupling component and the slave motor comprises a slave coupling component, the master and slave coupling components positioned adjacent to the first end of the housing and configured to engage with respective shafts of the lift mechanism.

16. A motor assembly according to claim 15, wherein the master and slave coupling components have different profiles for engaging with the respective shafts of the lift mechanism.

17. A motor assembly according to claim 1, wherein in both the first and second orientations, the master drive axis and the slave drive axis are located in the same positions within the rail of the architectural opening.

* * * * *